United States Patent [19]

Yamaoka et al.

[11] Patent Number: 4,934,491
[45] Date of Patent: Jun. 19, 1990

[54] SHOCK ABSORBER WITH IMPROVED STRUCTURE OF THRUSTING PISTON ASSEMBLY

[75] Inventors: Fumiyuki Yamaoka; Hideaki Orihara, both of Kanagawa, Japan

[73] Assignee: Atsugi Motor Parts Company, Limited, Kanagawa, Japan

[21] Appl. No.: 284,129

[22] Filed: Dec. 14, 1988

[30] Foreign Application Priority Data

Dec. 14, 1987 [JP] Japan ................. 62-315570
Dec. 22, 1987 [JP] Japan ............ 62-194276[U]
Dec. 22, 1987 [JP] Japan ............ 62-194278[U]

[51] Int. Cl.⁵ .............................. F16F 9/34
[52] U.S. Cl. .................. 188/322.15; 92/255; 188/282; 188/322.22; 403/260
[58] Field of Search ............ 188/322.15, 322.22, 188/282, 321.11, 322.11, 316; 92/255, 110, 109; 403/260, 261; 267/120, 124

[56] References Cited

U.S. PATENT DOCUMENTS

| | | | |
|---|---|---|---|
| 1,554,249 | 9/1925 | Wolf | 188/282 |
| 1,556,599 | 10/1925 | Harbecke | 188/282 |
| 3,036,669 | 5/1962 | Schultze | 188/282 |
| 3,391,721 | 7/1968 | Eosan . | |
| 3,734,483 | 5/1973 | Adams | 267/124 X |
| 3,816,701 | 6/1974 | Stormer . | |
| 3,867,871 | 2/1975 | Shore | 403/261 X |
| 3,975,992 | 8/1976 | Cagle | 92/110 X |
| 4,478,387 | 10/1984 | Postema | 188/322.15 X |
| 4,665,803 | 5/1987 | Mathauser | 92/99 |

FOREIGN PATENT DOCUMENTS

| | | |
|---|---|---|
| 0176738 | 4/1986 | European Pat. Off. . |
| 2352982 | 12/1977 | France . |
| 2454563 | 11/1980 | France . |
| 4340 | of 1912 | United Kingdom . |
| 881194 | 11/1961 | United Kingdom . |
| 1443083 | 7/1976 | United Kingdom . |
| 2113347 | 8/1983 | United Kingdom ........... 188/322.15 |

Primary Examiner—Douglas C. Butler
Attorney, Agent, or Firm—Bachman & LaPointe

[57] ABSTRACT

A piston assembly for a shock absorber comprises a piston rod which is formed with a threaded opening which extends axially and opens to an axial end, about which a piston body is mounted. A stud which is separately formed and independent of the piston rod, and extends through the piston body, engages with the threaded opening for securing the piston body thereonto.

13 Claims, 3 Drawing Sheets

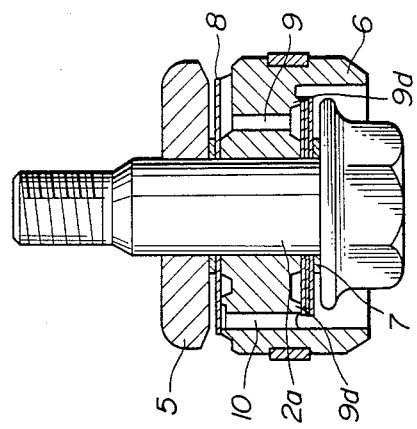
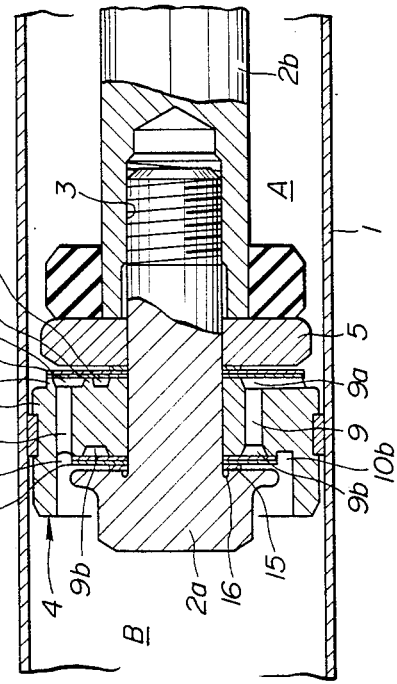
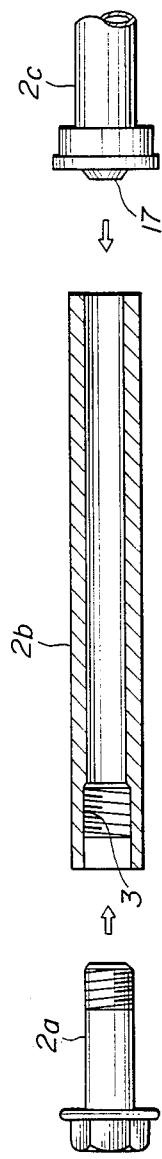

4,934,491

SHOCK ABSORBER WITH IMPROVED STRUCTURE OF THRUSTING PISTON ASSEMBLY

BACKGROUND OF THE INVENTION

1. Field of the Invention

The present invention relates generally to a shock absorber, such as that suitable for use in an automotive suspension system. More specifically, the invention relates to an improved construction of a piston assembly of the shock absorber.

2. Description of the Background Art

One of the general constructions of hydraulic shock absorbers has been disclosed in Japanese Utility Model First (unexamined) Publication (Jikkai) Showa 60-52438. In the shown construction, a thrusting piston is disposed within a fluid chamber defined in a cylinder filled with a working fluid. The piston is firmly secured on an inner end of a piston rod which extends through the cylinder. The piston rod has a stud section at the end engaged to the piston. The stud section is provided a smaller diameter than that of the major section of the piston rod. The piston engages with the stud section and firmly secured thereon by means of a fastening nut.

It is generally technology for providing satisfactorily high wear resistance for the major portion of the piston rod, which thrustingly moves along the axis of the cylinder with sliding contact with the end plug. Wear resistance is usually provided by induction hardening. When induction hardening is made for the end portion of the piston rod where the stud section has to be formed, machining becomes difficult. As a result, it is required to limit portion to perform hardening operation and to manage di-rectionality of the piston rod. This causes higher production cost. Furthermore, when a leaf spring valve is used for controlling fluid flow through the piston, a valve collar becomes necessary for avoiding interference or collision between the thread in the stud section and the inner peripheral edge of the leaf valve spring.

SUMMARY OF THE INVENTION

Therefore, it is an object of the present invention to provide an improved construction of a piston assembly which makes production easier and cheaper.

In order to accomplish aforementioned and other objects, a piston assembly for a shock absorber, according to the present invention, is formed with a threaded opening which extends axially and opens to an axial end, about which a piston body is mounted. A stud which is separately formed and independent of the piston rod, and extends through the piston body, engages with the threaded opening for securing the piston body thereonto.

According to one aspect of the invention, a piston assembly for a shock absorber comprises:
an essentially cylindrical piston rod having a first end inserted into an essentially hollow cylindrical shock absorber cylinder and a second extending from the shock absorber cylinder;
a piston thrustingly disposed within an interior space of the shock absorber cylinder and mounted on the first end of the piston rod;
a stud for securing the piston onto the first end of the piston rod; and
an axially extending stud receptacle opening extending from the first end of the piston rod and engageable with the stud for holding engagement with the stud and whereby rigidly securing the piston on the first end of the piston rod.

According to another aspect of the invention, a shock absorber comprises:
a hollow cylinder defining an interior space filled with a working fluid; and
a piston assembly including
an essentially cylindrical piston rod having a first end inserted into the hollow cylinder and a second end extending from the hollow cylinder;
a piston thrustingly disposed within the interior space of the hollow cylinder for separating the interior space into a first and a second chamber, and mounted on the first end of the piston rod;
a stud for securing the piston onto the first end of the piston rod; and
an axially extending stud receptacle opening extending from the first end of the piston rod and engageable with the stud for holding engagement with the stud and whereby rigidly securing the piston on the first end of the piston rod.

In the preferred construction, the piston rod comprises separately formed a first lower section and a second upper section, the first section having the first end and the second section having the second end, and the first and second sections being rigidly connected to each other. The first and second sections are connected to form the piston rod by way of projection welding.

The piston is formed with axially extending first and second through openings, one ends of respective first and second through openings being closed by means of a pressure responsive valve members which are in a form of annular disc-shaped configuration.

Preferably, the stud is formed with a groove extending at an interface between a bolt section and head, for avoiding interference between the inner peripheral edge of the valve members and the bolt section. The stud, the piston and the valve members are provided in a form of pre-assembly for assembling to the piston rod. The stud has a thread bolt portion threadingly engageable with the stud receptacle of the piston rod, the thread bolt portion having a calking portion to be engaged with female thread on the stud receptacle with a greater tightening torque than major portion thereof.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 3 is an enlarged section of the preferred construction of a piston assembly including the piston rod of FIG. 2 and a piston;

FIG. 4 is a section of a pre-assembly of a stud, a piston body, a collar, which pre-assembly is provided for transportation and assembling;

FIG. 5 is a longitudinal section of a modified construction of a piston rod to be employed in the preferred embodiment of the piston assembly according to the invention;

DESCRIPTION OF THE PREFERRED EMBODIMENT

Figure 1:
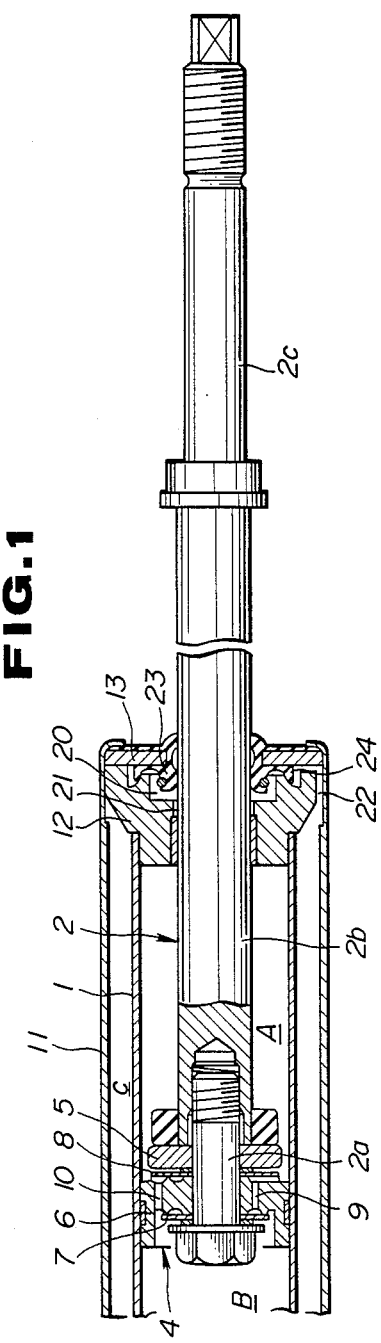
FIG. 1 is a partial section of the preferred embodiment of a shock absorber according to the present invention.

Referring now to the drawings, particularly to FIG. 1, the preferred embodiment of a shock absorber, according to the present invention, comprises an inner and an outer hollow cylinder 1 and 11 to form a double bottom type shock absorber. The inner cylinder 1 is coaxially disposed within the outer cylinder 11 for defining therebetween an annular chamber C.

A piston assembly generally comprises a piston 4 slidingly disposed within the interior space of the inner cylinder 1 for defining therein upper and lower fluid chambers A and B, and a piston rod 2. The piston rod 2 has a lower end connected to the piston 4 and an upper end extending through an upper end plug assembly which comprises a rod guide 12, a sealing member 13 and a rubber seal 14.

Figure 2:
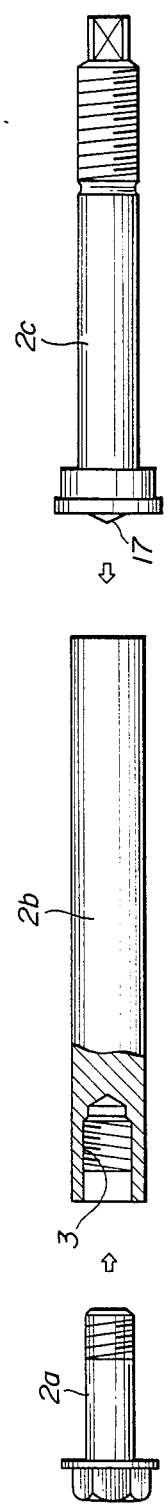
FIG. 2 is a partially sectioned and exploded front elevation of a piston rod employed in the preferred embodiment of the shock absorber of FIG. 1.

As particularly seen from FIG. 2, the piston rod 2 comprises mutually separately formed three rod or bar like components 2a, 2b and 2c. The upper component 2c is designed to be connected to a vehicular body via known mounting structure. The lower component 2b is designed to be inserted into the interior space of the inner cylinder 1 and extend through the upper fluid chamber A. The upper end of the lower component 2b extends upwardly from the cylinder. The upper end of the lower component 2b mates with the lower end of the upper component 2c and rigidly connected to the latter by projection welding. Therefore, after assembling, the upper and lower components 2c and 2b forms an integral bar member generally serving as the piston rod 2.

The lower component 2b of the piston rod 2 is formed with an axially extending threaded opening 3, to which the stud component 2a comprising a stud bolt, engages for mounting and securing a piston 4. As seen from FIGS. 1 and 3, the piston 4 generally includes a piston body 6 and a rebounding stopper 5. The piston body 6 is formed with a plurality of axially extending through openings 9 and 10 communicating the upper and lower fluid chambers A and B. As seen from FIG. 3, the openings 9 and 10 are radially offset from each other to be oriented at positions different distance to the piston rod. The upper and lower ends of the openings are connected to each other via grooves 9a, 9b and 10a, 10b. Essentially annular disc shaped resilient valve member 8 is provided in opposition to the upper end of the through openings 9 and 10. The valve member 8 normally seats on land portions 9c and 10c extending along radially inner and outer edges of the grooves 9a and 10a. The outer land portion 9c has one or more cut outs for establishing fluid communication between the upper fluid chamber A and the through openings 9. Similarly, essentially annular resilient valve member 7 opposes the lower ends of the through openings 9 and 10. The valve member 7 normally seats on land portion 9d extending along radially inner and outer edges of the groove 9b. The outer land portion 10c has one or more cut outs for establishing fluid communication between the upper fluid chamber A and the through openings 10. With the shown construction, the upper valve member 8 is responsive to the fluid pressure in the lower fluid chamber B for establishing fluid communication between the upper fluid chamber A and the lower fluid chamber B in response to the fluid pressure in the lower fluid chamber overcoming the resilient force thereof. Similarly, the upper valve member 7 is responsive to the fluid pressure in the upper fluid chamber A for establishing fluid communication between the upper fluid chamber A and the lower fluid chamber B in response to the fluid pressure in the upper fluid chamber overcoming the resilient force thereof.

The piston body 6 is mounted on the lower end of the piston rod 2 together with the collar 5 with a rubber cushion 5a. The assembly of the piston body 6 and the collar 5 is secured onto the lower end of the piston rod 2 by means of the stud bold 2a as set forth above. As seen from FIG. 3, the stud bolt 2a is formed with a groove 16 at a junction between the stud section and bolt head so as to avoid interference between a washer 15 and the bolt head.

With the shown construction, the through openings 9 and 10 serve for limiting fluid flow rate flowing between the upper and lower fluid chambers A and B and thus absorbing vibration energy.

The end plug assembly defines a communication chamber 20 therein. The communication chamber 20 is communicated with the upper fluid chamber A via an axially defined annular path 21 which extends through the rod guide 12. On the other hand, the communication chamber 20 also communicates with the annular chamber C via a flow passage 22. A rubber bushing 23 is disposed between the sealing member 13 and the rod guide 12, the rubber bushing 23 has a seal lip 24 which blocks between the communication chamber 20 and the flow passage 22. The seal lip 24 is responsive to the fluid pressure in the upper fluid chamber A to permit fluid flow from the upper fluid chamber A to the annular chamber C when fluid pressure in the upper fluid chamber becomes greater than the fluid pressure in the annular chamber at a magnitude greater than a predetermined value.

In order to perform heat treatment of the piston rod 2 for providing wear resistance, only lower component 2b is placed in a furnace for hardening treatment. In the hardening treatment, it is not necessary to pay an attention for area of the rod to perform hardening treatment and direction of the rod. This makes heat treatment substantially easier in comparison with that in the prior art.

On the other hand, it is preferred that, in the transportation and assembling, the piston body 6, the collar 5, the valve members 7 and 8 are preliminarily mounted assembled with the stud bolt 2a as a pre-assembly 25, as shown in FIG. 4. The pre-assembly 25 is transported and supplied to the assembling line. This makes transportation and assembling operation performed in the assembling line easier.

Furthermore, since the piston 4 is secured on the end of the piston rod 2 by means of the stud bolt 2a, interference between the edge of the center openings of the valve members 7 and 8 and the threaded position may not occur. Therefore, necessity of the spacer can be avoided.

FIG. 5 shows modification of the preferred construction of piston assembly according to the invention. In this modification, the lower component 2b of the piston rod 2 is formed of a cylindrical member. In such case, a thread 3a is formed on the inner periphery of one end of the cylindrical lower component 2a. The thread of the stud bolt 2a engages with the thread 3a for securing the piston 4, the collar 5 and valve members 7 and 8. On the other hand, the other end of the lower component 2a is secured to the opposing end of the upper component 2c by way of ring projection welding utilizing the projection 17. In the alternative, it would be possible to use an insert with a female thread axially extending therethrough. The insert may rigidly secured on the one end of the lower component 2b. In such case, the stud bolt 2a engages with the female thread formed through the insert.

Figure 6:
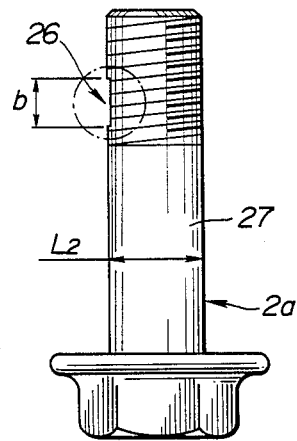
FIG. 6 is a front elevation of a modified construction of a stud bolt employed in the preferred construction of the piston assembly of FIG. 3.
Figure 8:
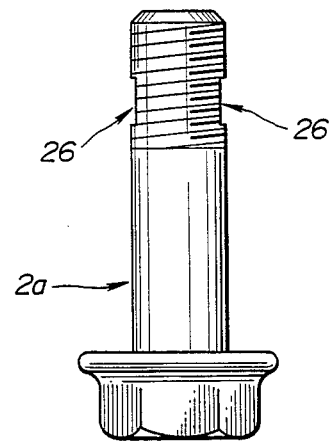
FIG. 8 is a side elevation of a modification of the stud bolt to be employed in the preferred construction of the piston assembly.
Figure 7:
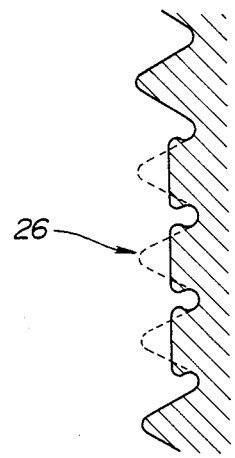
FIG. 7 is an enlarged section showing part of the stud bold of FIG. 6.
Figure 9:
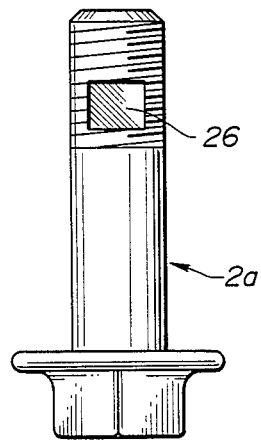
FIG. 9 is a front elevation of the modified stud bolt of FIG. 7 to be employed in the preferred construction of the piston assembly.

FIGS. 6 and 7 illustrate a modification of the stud bolt 2a to be employed in the preferred embodiment of the piston assembly. In the shown modification, the stud bolt 2a is formed with a calking portion 26. The calking portion 26 is formed at a orientation in the vicinity of the end of the threaded portion remote from the tip end of the stud bolt. The calking portion 26 is engaged with the female thread in the threaded opening 3 with a greater tightening torque. The calking portion 26 is formed essentially rectangular area in front elevation and extends in a length b which is slightly shorter than plane periphery section of the opening 3. Furthermore, in the shown embodiment, the bar section 27 where no thread is formed and has plane cylindrical section has a diameter $L_2$ essentially equal to the diameter of the plane periphery section of the opening 3. Therefore, the outer periphery of the bar section 27 firmly engage with the plane periphery section of the opening. Therefore, this portion 26 creates greater loosening torque for resisting against rotational torque which may exerted thereon while the shock absorber is in use. Thus, this calking portion 26 serves for preventing the bolt from loosening. Furthermore, the calking portion serves for storing small metal chips created when tightening the stud into the threaded opening 3. Therefore, the calking portion 26 is effective for preventing the small metal chips created due to presence of burr and so forth during threading operation from entering into the working fluid. For this, firm engagement between the outer periphery of the bar section of the stud 2a and the plane inner periphery of the plane periphery section of the opening 3 aids for preventing the metal chip from entering into the working fluid. Though the example of FIGS. 6 and 7 provides only one calking portion on the stub bolt 2a, it may be possible to provide more than one calking portions 26. For example, the further modification illustrated in FIGS. 8 and 9 forms a pair of calking portions 26 at radially symmetrical orientations.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A piston assembly for a shock absorber comprising:
    an essentially cylindrical piston rod having a first end inserted into an essentially hollow cylindrical shock absorber cylinder and a second extending from said shock absorber cylinder;
    a piston thrustingly disposed within an interior space of said shock absorber cylinder and mounted on said first end of said piston rod, said piston defining at least one axially extending passage for permitting fluid flow therethrough;
    an essentially disc shaped valve member provided at least one end of said axially extending passage for resiliently closing the associated end of said axially extending passage so as to restrict fluid flow therethrough in order to generate a damping force;
    a stud for securing said piston onto said first end of said piston rod, said stud being provided an axial length sufficient for assembling said piston and said valve member in axial alignment into a pre-assembly in advance of securing said piston onto said first end of said piston rod; and
    an axially extending stud receptacle opening extending from said first end of said piston rod and engageable with said stud for holding engagement with said stud and whereby rigidly securing said piston on said first end of said piston rod.

2. A piston assembly as set forth in claim 1, wherein said piston rod comprises separately formed a first lower section and a second upper section, said first section having said first end and said second section having said second end, and said first and second sections being rigidly connected to each other.

3. A piston assembly as set forth in claim 2, wherein said first and second sections are connected to form said piston rod by way of projection welding.

4. A piston assembly as set forth in claim 1, wherein said piston is formed with axially extending first and second through openings, one ends of respective first and second through openings being closed by means of a pressure responsive valve members which are in a form of annular disc-shaped configuration.

5. A piston assembly as set forth in claim 4, wherein said stud, said piston and said valve members are provided in a form of pre-assembly for assembling to said piston rod.

6. A piston assembly as set forth in claim 1, wherein said stud has a thread bolt portion threadingly engageable with said stud receptacle of said piston rod, said thread bolt portion having a calking portion to be engaged with female thread on said stud receptacle with a greater tightening torque than major portion thereof.

7. A piston assembly for a shock absorber comprising:
    an essentially cylindrical piston rod having a first end inserted into an essentially hollow cylindrical shock absorber cylinder and a second extending from said shock absorber cylinder;
    a piston thrustingly disposed within an interior space of said shock absorber cylinder and mounted on said first end of said piston rod;
    a stud for securing said piston onto said first end of said piston rod, said stud being formed with a groove extending at an interface between a bolt section and head, for avoiding interference between the inner peripheral edge of said valve members and said bolt section; and an axially extending stud receptacle opening extending from said first end of said piston rod and engageable with said stud for holding engagement with said stud and whereby rigidly securing said piston on said first end of said piston rod.

8. A shock absorber comprising:
a hollow cylinder defining an interior space filled with a working fluid; and
a piston assembly including
an essentially cylindrical piston rod having a first end inserted into said hollow cylinder and a second end extending from said hollow cylinder;
a piston thrustingly disposed within said interior space of said hollow cylinder for separating said interior space into a first and a second chamber, and mounted on said first end of said piston rod, said piston rod is formed with axially extending first and second through openings, one ends of respective first and second through openings being closed by means of a pressure responsive valve members which are in a form of annular disc-shaped configuration;
a stud for securing said piston onto said first end of said piston rod, said piston defining at least one axially extending passage for permitting fluid flow therethrough, said stud, said piston and said valve members are provided in a form of preassembly for assembling to said piston rod;
an essentially disc shaped valve member provided at least one end of said axially extending passage for resiliently closing the associated end of said axially extending passage so as to restrict fluid flow therethrough in order to generate a damping force; and
an axially extending stud receptacle opening extending from said first end of said piston rod and engageable with said stud for holding engagement with said stud and whereby securing said piston valve member on said first end of said piston rod.

9. A shock absorber as set forth in claim 8, wherein said piston rod comprises separately formed a first lower section and a second upper section, said first section having said first end and said second section having said second end, and said first and second sections being rigidly connected to each other.

10. A shock absorber as set forth in claim 9, wherein said first and second sections are connected to form said piston rod by way of projection welding.

11. A shock absorber as set forth in claim 8, wherein said stud has a thread bolt portion threadingly engageable with said stud receptacle of said piston rod, said thread bolt portion having a calking portion to be engaged with female thread on said stud receptacle with a greater tightening torque than major portion thereof.

12. A shock absorber comprising:
a hollow cylinder defining an interior space filled with a working fluid; and
a piston assembly including
an essentially cylindrical piston rod having a first end inserted into said hollow cylinder and a second end extending from said hollow cylinder;
a piston thrustingly disposed within said interior space of said hollow cylinder for separating said interior space into a first and a second chamber, and mounted on said first end of said piston rod;
a stud for securing said piston onto said first end of said piston rod, said stud being formed with a groove extending at an interface between a bolt section and head, for avoiding interference between the inner peripheral edge of said valve members and said bolt section; and
an axially extending stud receptacle opening extending from said first end of said piston rod and engageable with said stud for holding engagement with said stud and whereby rigidly securing said piston on said first end of said piston rod.

13. A shock absorber comprising:
a hollow cylinder defining an interior space filled with a working fluid; and
a piston rod having a first end inserted into said hollow cylinder and a second end extending from said hollow cylinder, said piston rod defining an axially extended threaded bore at said first end;
a piston pre-assembly including
a piston thrustingly disposed within said interior space of said hollow cylinder for separating said interior space into a first and a second chamber, and said piston defining an axially extending center opening and radially shifted first and second openings which forms fluid flow path between said first and second chambers;
a first valve member disposed one side of said piston for resiliently closing one end of said first opening, said first valve member defining a center opening;
a second valve member disposed the other side of said piston for resiliently closing the end of said second opening, which end of said second opening opens at said the other side of said piston, and said second valve member defining a center opening;
a stud for securing said piston onto said first end of said piston rod, said stud having a first section extending through said center openings of said first valve member, said piston and said second valve member for forming the piston pre-assembly, and a second threaded position extended from said piston pre-assembly for threadingly engaging with said threaded bore for securing said pre-assembly onto said first end of said piston rod.

* * * * *